(12) United States Patent
Ko et al.

(10) Patent No.: US 10,416,416 B1
(45) Date of Patent: Sep. 17, 2019

(54) OPTICAL LENS

(71) Applicant: HON HAI PRECISION INDUSTRY CO., LTD., New Taipei (TW)

(72) Inventors: Chun-Cheng Ko, New Taipei (TW); Ming-Lin Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 35 days.

(21) Appl. No.: 15/955,812

(22) Filed: Apr. 18, 2018

Related U.S. Application Data (60) Provisional application No. 62/651,063, filed on Mar. 30, 2018.

(51) Int. Cl.
*G02B 9/62* (2006.01)
*G02B 13/00* (2006.01)

(52) U.S. Cl.
CPC .......... *G02B 13/0045* (2013.01); *G02B 9/62* (2013.01)

(58) Field of Classification Search
CPC .............................. G02B 13/0045; G02B 9/62
See application file for complete search history.

(56) References Cited

U.S. PATENT DOCUMENTS 9,964,739 B1 * 5/2018 Shi ...................... G02B 13/0045

\* cited by examiner

*Primary Examiner* — Joseph P Martinez
(74) *Attorney, Agent, or Firm* — ScienBiziP, P.C.

(57) ABSTRACT

An optical lens of the present disclosure assembly includes, in order from an object side to an image side, a first lens element, a second lens element, a third lens element, a fourth lens element, a fifth lens element, a sixth lens element, an optical filter and an optical sensor. The first lens element, the fourth lens element and the fifth lens element each have positive power. The second lens element, the third lens element and the sixth lens element each have negative power.

13 Claims, 10 Drawing Sheets

OPTICAL LENS

FIELD

The subject matter herein generally relates to a lens, especially, relates to an optical lens.

BACKGROUND

With the development of electrical devices, such as cell phones and tables have become thin and light for convenient carrying. So optical lens mounted in electrical devices is needed to have small focal length and small effective diameter of light exiting surface.

Further, people hope that modern electrical devices can capture more scenery and have high image quality while taking photos in a low light environment. So, optical lens with wide angles are used to acquire more visible light to capture more images, and optical lens with large aperture are used to improve the image quality when taking photos in low light environment. Thus, the optical lens applied in the electrical device not only need to have small length and small effective diameter of exiting surface, but also need to have wide view angle and large aperture.

BRIEF DESCRIPTION OF THE DRAWINGS

Implementations of the present technology will now be described, by way of example only, with reference to the attached figures.

DETAILED DESCRIPTION OF EMBODIMENTS

It will be appreciated that for simplicity and clarity of illustration, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure. The description is not to be considered as limiting the scope of the embodiments described herein.

Several definitions that apply throughout this disclosure will now be presented. The term "comprising" means "including, but not necessarily limited to"; it specifically indicates open-ended inclusion or membership in a so-described combination, group, series and the like. The term "coupled" is defined as connected, whether directly or indirectly through intervening components, and is not necessarily limited to physical connections. The connection can be such that the objects are permanently connected or releasably connected.

Figure 1:
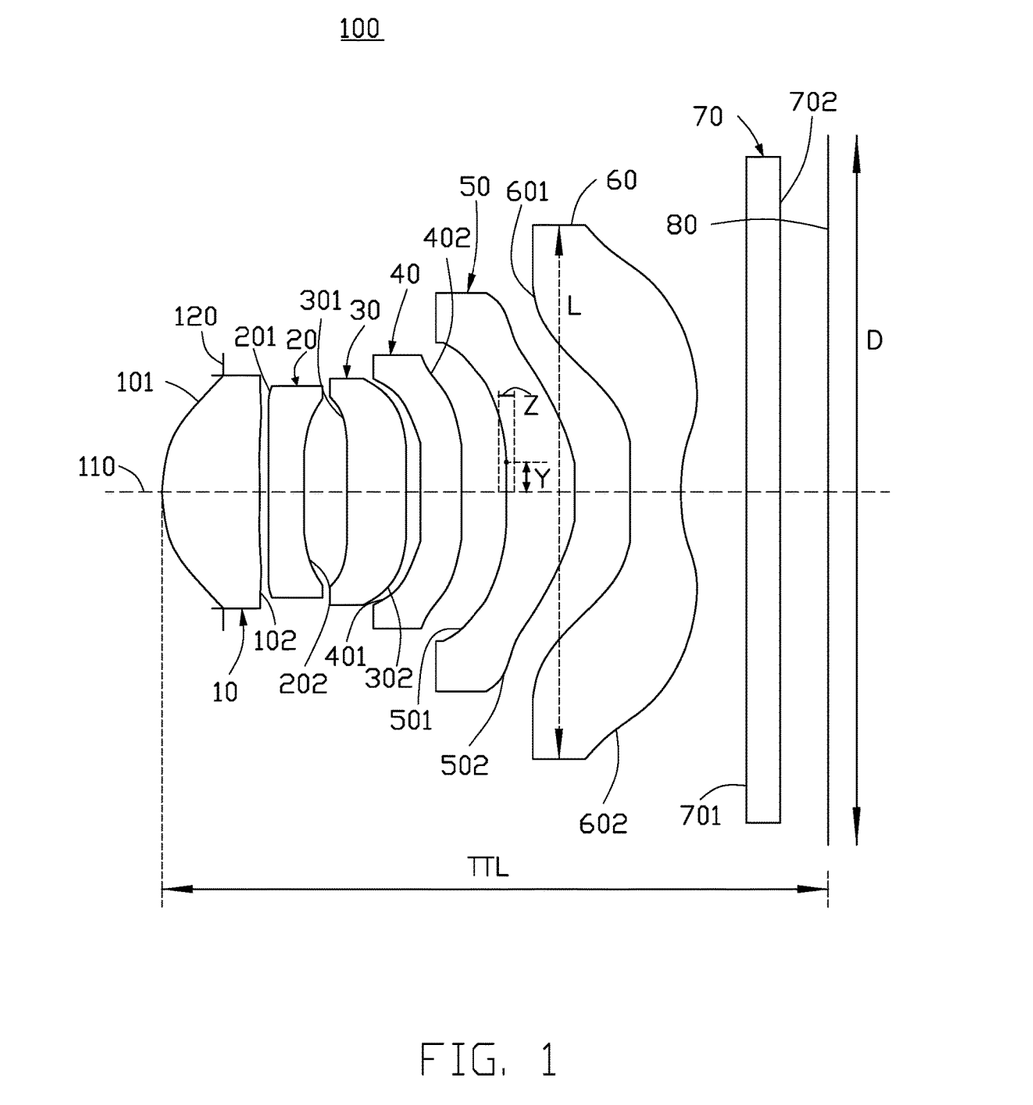
FIG. 1 is a diagrammatic, cross sectional view of an optical lens of a first embodiment.
Figure 6:
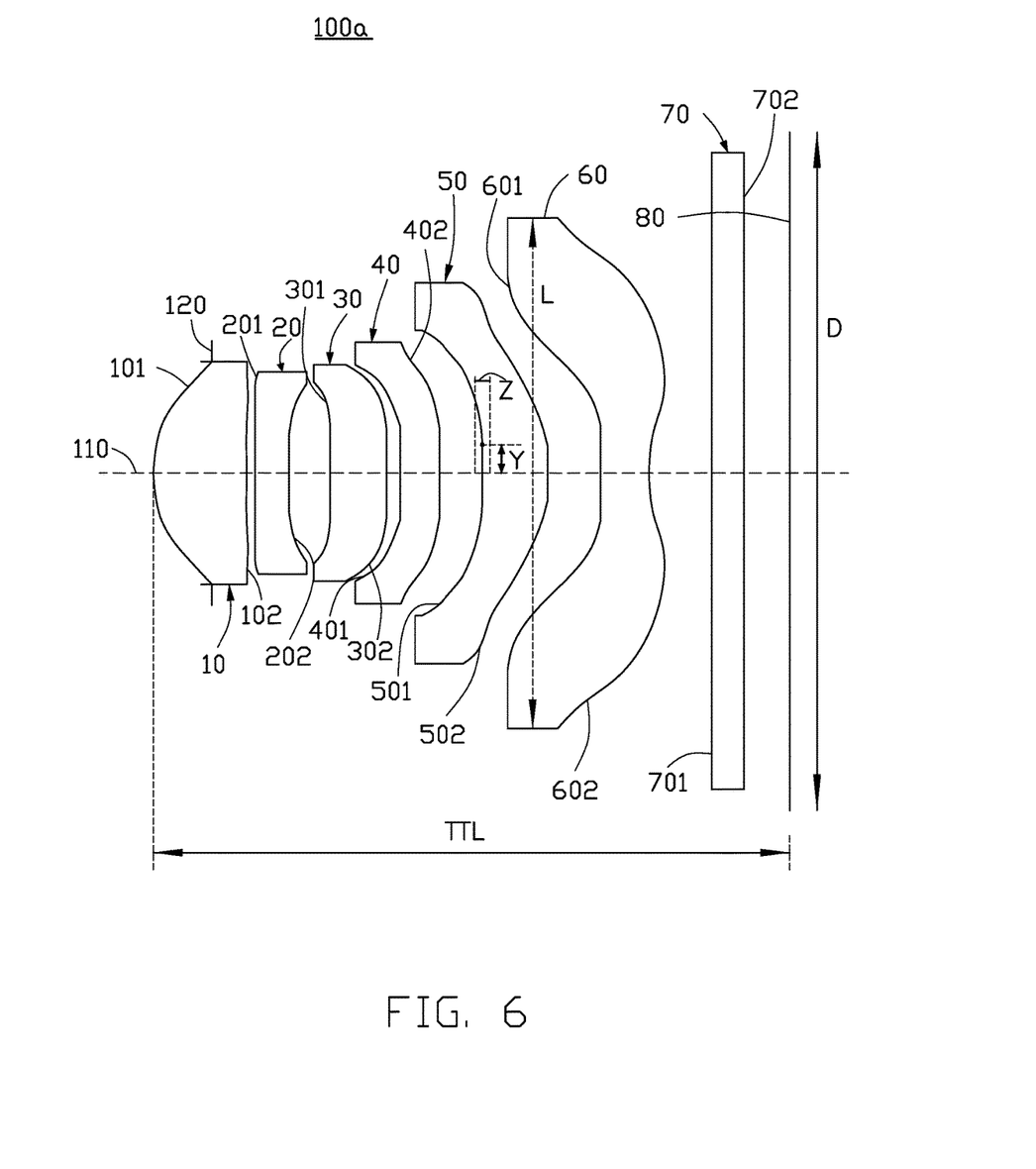
FIG. 6 is a diagrammatic, cross sectional view of an optical lens of a second embodiment

Referring to FIG. 1 and FIG. 6, an optical lens 100, 100a of the present disclosure assembly in order from an object side to an image side includes a first lens element 10, a second lens element 20, a third lens element 30, a fourth lens element 40, a fifth lens element 50, a sixth lens element 60, an optical filter 70 and a optical sensor 80.

The optical lens also has an optical axis 110. The first lens element 10, a second lens element 20, a third lens element 30, a fourth lens element 40, a fifth lens element 50 and a sixth lens element 60 are symmetrical about the optical axis 110.

The first lens element 10 has positive power and has a first surface 101 and a second surface 102 opposite to the first surface 101. The first surface 101 is aspheric and convex on the object side. The second surface 102 is aspheric. The second surface 102 is concave on the image side.

An aperture 120 is mounted in front of the first lens element 10 and toward the object side. The aperture 120 is located on the optical axis 110.

The second lens element 20 has negative power. The second lens element 20 has a third surface 201 and a fourth surface 202. The third surface 201 is aspheric and is convex on the object side. The fourth surface 202 is aspheric and is concave on the image side.

The third lens element 30 has negative power. The third lens element 30 has a fifth surface 301 and a sixth surface 302. The fifth surface 301 is aspheric and is concave on the object side. The sixth surface 302 is aspheric and is convex on the image side.

The fourth lens element 40 has positive power. The fourth lens element 40 has a seventh surface 401 and an eighth surface 402. The seventh surface 401 is concave on the object side. The eighth surface 402 is convex on the image side.

The fifth lens element 50 has positive power. The fifth lens element 50 has a ninth surface 501 and a tenth surface 502. Both the ninth surface 501 and the tenth surface 502 are aspheric. The ninth surface 501 is concave on the object side. The tenth surface 502 is convex on the image side.

The sixth lens element 60 has negative power. The sixth lens element 60 has an eleventh surface 601 and a twelfth surface 602. The eleventh surface 601 is aspheric and is concave on the object side. A center of the twelfth surface 602 is concave on the image side, an edge of the twelfth surface 602 is convex on the image side.

The optical filter 70 has a front surface 71 and a rear surface 72. The front surface 71 and the rear surface are flat planes. The optical filter 70 is used to filter infrared light throughout the sixth lens element 60.

The first surface 101, the second surface 102, the third surface 201, the fourth surface 202, the fifth surface 301, the sixth surface 302, the seventh surface 401, the eighth surface 402, the ninth surface 501, the tenth surface 502, the eleventh surface 601 and the twelfth surface 602 are aspherical surfaces. The even numbered aspherical surface are shaped according to the formula:

$$Z = \frac{ch^2}{1+\sqrt{1-(k+1)c^2h^2}} + \sum A_i h^i \quad (a)$$

Wherein Z is aspherical surface sag of surface, h is a surface height from the optical axis 110, c is a curvature, k is a conic constant, and Ai are i-th order aspheric coefficients of surface.

The optical lens satisfies the formulas:

$D/TTL>1.32;$ (1)

$D/L>1.22;$ (2)

$0.017>|Z/Y|>0$ (3)

$8.35>D/(2*Y)>8.09$ (4)

$0.67>|G4R1/F4|>|G1R1/F1|>|G2R2/F2|>0.27$ (5)

$3.84>|G4R2/F4|>|G1R2/F1|>|G2R1/F2|>0.73$ (6)

$G5R1/F5<G6R2/F6$ (7)

$|G5R2/F5|<|G6R1/F6|$ (8)

$G1R1/F1>0.33$ (9)

$G1R2/F1<2.05$ (10)

$G2R1/F2<-0.73$ (11)

$G2R2/F2<-0.27$ (12)

$G4R1/F4<0.67$ (13)

$G4R2/F4>3.55$ (14)

$G5R1/F5<-13.70$ (15)

$G5R2/F5<-0.42$ (16)

$8.70>G6R1/F6>-16.58$ (17)

$G6R2/F6<-0.43$ (18)

$Vd1>42, Vd3>42, Vd5>42, Vd6>42$ (19)

$Vd2<33, Vd4<33$ (20)

Wherein, D is a diameter of the maximum imaging circle. TTL is a length along the optical axis defined between the first surface 101 and the optical sensor 80. L is effective diameter of the twelfth surface 602. Z is a length between the lowest sag position and center position on the ninth surface 501 along the axis direction. Y is a vertical height defined between the maximum sag of the ninth surface 501 and the optical axis 110. G1R1 is the radius of curvature of the first surface 101. G1R2 is the radius of the curvature of the second surface 102. G2R1 is the radius of curvature of the third surface 201. G2R2 is the radius of the curvature of the fourth surface 202. G4R1 is the radius of curvature of the seventh surface 401. G4R2 is the radius of the curvature of the eighth surface 402. G5R1 is the radius of curvature of the ninth surface 501. G5R2 is the radius of curvature of the tenth surface 502. G6R1 is radius of curvature of the eleventh surface 502. G6R2 is the radius of curvature of the twelfth surface 602. F1 is the focal length of the first lens element 10. F2 is the focal length of the second lens element 20. F4 is the focal length of the fourth lens element 40. F5 is the focal length of the fifth lens element 50. F6 is the focal length of the sixth lens element 60. Vd1 is the Abbe number of the first lens element 10. Vd2 is the Abbe number of the second lens element 20. Vd3 is the Abbe number of the third lens element 30. Vd4 is the Abbe number of the fourth lens element 40. Vd5 is the Abbe number of the fifth lens element 50. Vd6 is the Abbe number of the sixth lens element 60.

The formula (1) is used to limit the length of the optical lens. The formula (2) is used to limit the effective diameter of exiting surface of optical lens. The formulas (3)-(4) is used to decrease the power of the first lens element 10, the second lens element 20, the third lens element 30 and the fourth lens element 40. The formulas (5)-(6) is used to distribute the power of the optical lens. The formulas (7)-(8) is used to balance the power of the fifth lens element 50 and the sixth lens element 60, and also decrease the power of the first lens element, the second lens element 20, the third lens element 30, the fourth lens element 40 and the fifth lens element 50. Thus, The formulas (1)-(8) makes that the optical lens has a small length, a big aperture and a small effective diameter of exiting surface, and also has high image quality.

Further, the formulas (9)-(18) further improve the image quality of the optical lens. The formulas (19)-(20) is used to eliminate the color aberration of the optical lens.

The following embodiment specifically illustrated the optical lens by different parameter.

Referring to tables 1-3 illustrated an optical lens of a first embodiment. In the first embodiment, the optical lens satisfies the parameter of tables 1-3. The symbols listed below are used in tables 1-3.

R: a radius of curvature.

L: a distance between surfaces on the optical axis 110.

N: a refractive index of lens element.

Vd: an Abbe number.

k: a conic constant.

F: a focal length of the optical lens.

F/NO: a diameter of the aperture.

TABLE 1

| surfaces | type | R (mm) | L (mm) | N | Vd | k |
|---|---|---|---|---|---|---|
| object | Standard | Infinity | Infinity | | | |
| apeture | Standard | Infinity | −0.41 | | | |
| First surface | aspheric | 1.47 | 0.66 | 1.54 | 56.0 | −0.55 |
| Second surface | aspheric | 6.50 | 0.06 | | | −90.00 |
| Third surface | aspheric | 8.85 | 0.25 | 1.66 | 20.4 | −16.91 |
| Fourth surface | aspheric | 3.91 | 0.31 | | | 6.59 |
| Fifth surface | aspheric | 448.98 | 0.40 | 1.54 | 56.0 | 76.01 |
| Sixth surface | aspheric | 8.77 | 0.11 | | | −89.81 |
| Seventh surface | aspheric | 11.69 | 0.28 | 1.66 | 20.4 | 64.63 |
| Eighth surface | aspheric | 76.94 | 0.26 | | | −85.00 |
| Ninth surface | aspheric | −48.18 | 0.53 | 1.54 | 56.0 | −90.00 |
| Tenth surface | aspheric | −1.84 | 0.38 | | | −8.27 |
| Eleventh surface | aspheric | 40.73 | 0.34 | 1.54 | 56.0 | 90.00 |
| Twelfth surface | aspheric | 1.30 | 0.47 | | | −7.18 |
| Front surface | Standard | Infinity | 0.21 | 1.52 | 54.5 | |
| Rear surface | Standard | Infinity | 0.33 | | | |
| Optical sensor | Standard | — | | | | |

TABLE 2

| Aspheric coefficient | First surface | Second surface | Third surface | Fourth surface | Fifth surface | Sixth surface |
|---|---|---|---|---|---|---|
| A4  | 0.030147  | −0.12659  | −0.21206  | −0.10919 | −0.2071   | −0.48617 |
| A6  | −0.04582  | 0.228092  | 0.417722  | 0.23983  | 0.256909  | 0.788754 |
| A8  | 0.171905  | −0.24426  | −0.34069  | −0.15065 | −0.79261  | −1.67863 |
| A10 | −0.27876  | 0.150737  | 0.101591  | 0.115072 | 1.3005    | 2.210886 |
| A12 | 0.228621  | −0.06182  | 0.068168  | −0.1611  | −1.13527  | −1.4998 |
| A14 | −0.08268  | 0.006641  | −0.038    | 0.170154 | 0.395961  | 0.371757 |
| A16 |           |           |           |          |           |          |

| Aspheric coefficient | seventh surface | eighth surface | ninth surface | tenth surface | eleventh surface | twelfth surface |
|---|---|---|---|---|---|---|
| A4  | −0.57449 | −0.3132  | 0.013848 | 0.01172   | −0.39012 | −0.22951 |
| A6  | 0.566205 | 0.072085 | −0.34426 | −0.18436  | 0.12172  | 0.145903 |
| A8  | −0.56031 | 0.33162  | 0.494627 | 0.171409  | 0.048382 | −0.06422 |
| A10 | 0.483324 | −0.45649 | −0.35572 | −0.04987  | −0.03832 | 0.019102 |
| A12 | −0.23585 | 0.22993  | 0.120889 | −0.00159  | 0.009724 | −0.00364 |
| A14 | 0.003805 | −0.03823 | −0.01558 | 0.003141  | −0.00114 | 0.000389 |
| A16 |          |          |          | −0.00041  | 5.20E−05 | −1.73E−05 |

TABLE 3

| F (mm) | F/NO | 2ω | D (mm) | TTL (mm) | Z (mm) |
|---|---|---|---|---|---|
| 3.94 | 1.85 | 78.40° | 6.522 | 4.591 | −0.0023 |

| Y (mm) | L (mm) | F1 (mm) | F2 (mm) | F4 (mm) | F5 (mm) | F6 (mm) |
|---|---|---|---|---|---|---|
| 0.395 | 4.94 | 3.34 | −10.71 | 20.60 | 3.49 | −2.47 |

Figure 2:
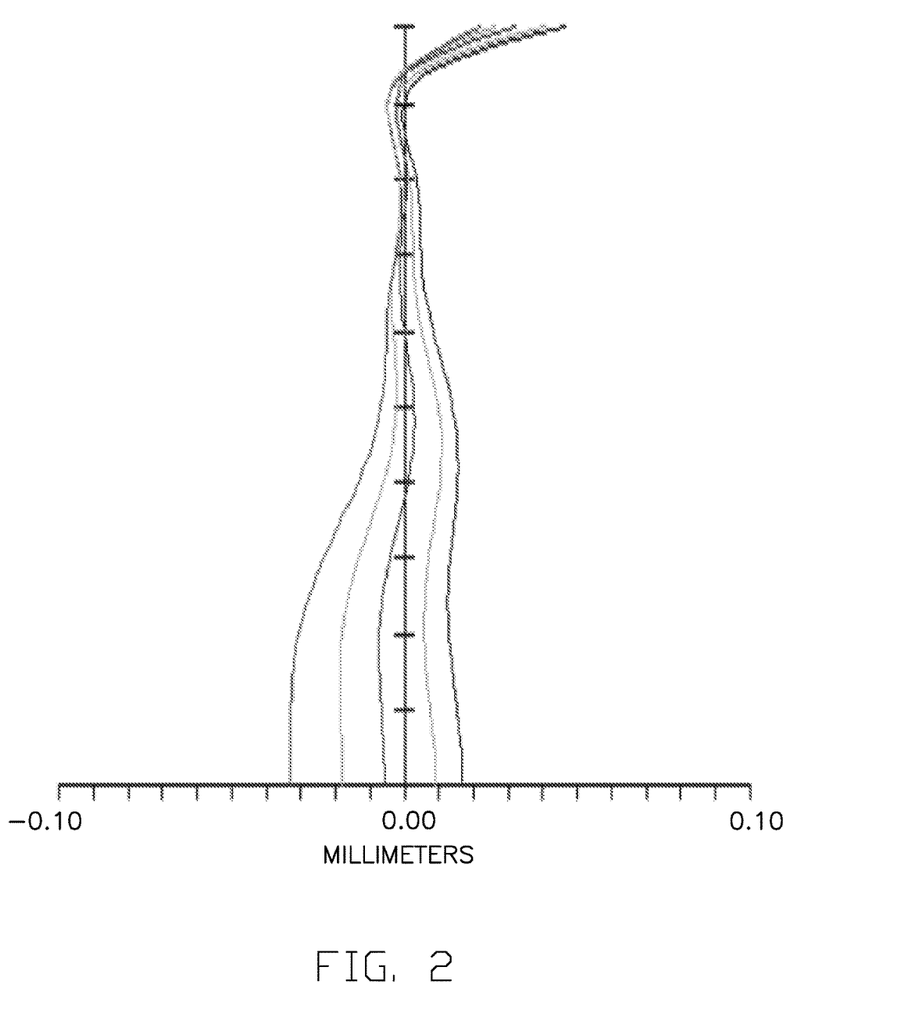
FIG. 2 is a graph showing spherical aberration of the optical lens of a first embodiment.
Figure 3:
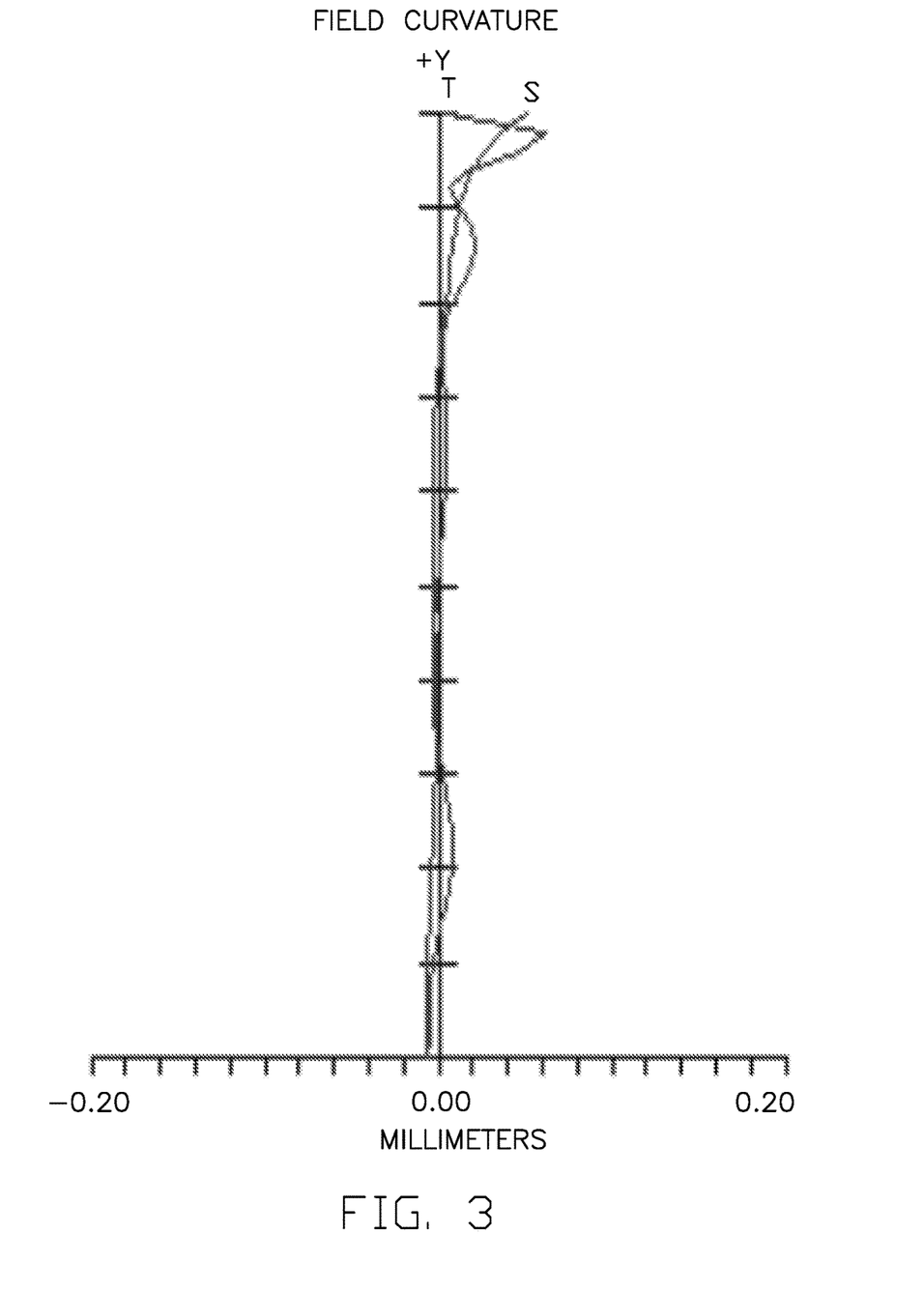
FIG. 3 is a graph showing field curvature of the optical lens of the first embodiment.
Figure 4:
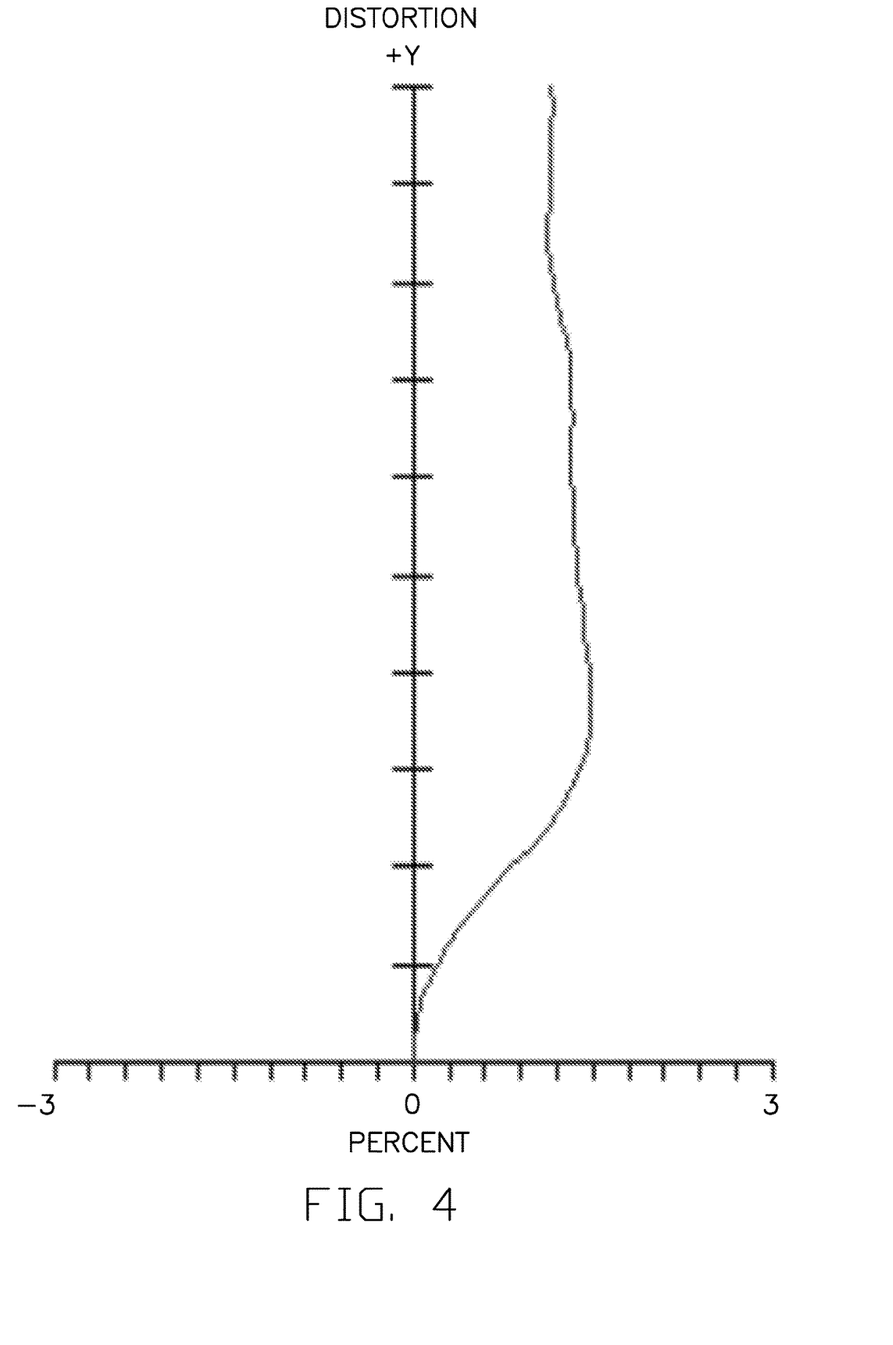
FIG. 4 is a graph showing distortion of the optical lens of the first embodiment.
Figure 5:
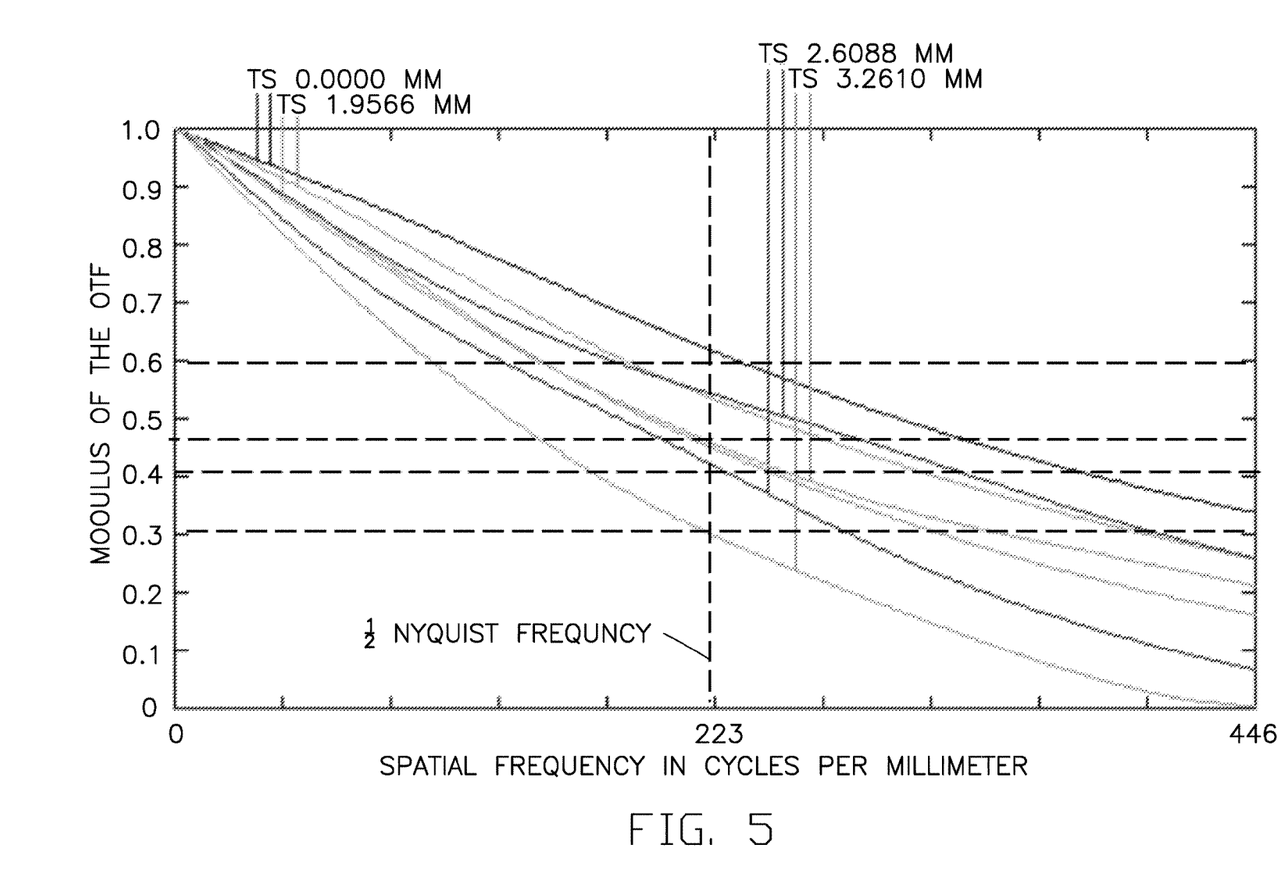
FIG. 5 is a graph showing the modulus of the optical transfer function (MTF) of the field view at ½ Nyquist frequency of the first embodiment.

In the first embodiment, the longitudinal spherical aberration graph, the field curvature graph, the distortions graph of the optical lens are respectively shown in FIGS. 2-4. The spherical aberration of visible light (with a wavelength between 400-700 nm) shown in FIG. 2 is within a range of −006-0.06 mm. The sagittal field curvature and the tangential field curvature of visible light shown in FIG. 3 are kept in −0.065-0.065 mm. The distortion of visible light in FIG. 4 falls with a range of 0-2%. FIG. 5 illustrates the MTF of the field view at ½ Nyquist frequency. In the exemplary embodiment, the ½ Nyquist frequency is 223 1p/mm. The MTF in central field view in FIG. 5 is bigger than 60%, the MTF in 0.8 field view in FIG. 5 is bigger than 40%, the MTF between 0.8 field view and the central field view in FIG. 5 is 40%-60%, the MTF in 1.0 view in FIG. 5 is bigger than 25%. Obviously in the second embodiment, the spherical aberration, field curvature, distortion and MTF of the field view at ½ Nyquist frequency are well controlled in the optical lens. In the first embodiment, the spherical aberration, the field curvature, the distortion and the field view of MTF are well controlled in the optical lens.

Referring to tables 4-6 illustrate an optical lens of a second embodiment. In the second embodiment, the optical lens satisfies the parameters of Tables 6-10. The symbols listed below are used in Tables 6-10.

R: a radius of curvature.
L: a distance between surfaces on the optical axis 110.
N: a refractive index of lens element.
V: an Abbe number of lens element.
k: a conic constant.
F: a focal length of the optical lens.
F/NO: a diameter of the aperture.

TABLE 4

| surfaces | type | R(mm) | L(mm) | N | Vd | k |
|---|---|---|---|---|---|---|
| object           | Standard | Infinity | Infinity |      |      |        |
| apeture          | Standard | Infinity | −0.41    |      |      |        |
| First surface    | aspheric | 1.46     | 0.66     | 1.54 | 56.0 | −0.52  |
| Second surface   | aspheric | 5.82     | 0.06     |      |      | −89.95 |
| Third surface    | aspheric | 10.73    | 0.25     | 1.66 | 20.4 | −52.68 |
| Fourth surface   | aspheric | 4.68     | 0.31     |      |      | 12.79  |
| Fifth surface    | aspheric | −32.05   | 0.40     | 1.54 | 56.0 | 60.60  |
| Sixth surface    | aspheric | 11.57    | 0.11     |      |      | −83.10 |
| Seventh surface  | aspheric | 11.79    | 0.28     | 1.66 | 20.4 | 43.51  |
| Eighth surface   | aspheric | 76.13    | 0.26     |      |      | −85.00 |
| Ninth surface    | aspheric | −36.41   | 0.53     | 1.54 | 56.0 | −90.00 |
| Tenth surface    | aspheric | −1.84    | 0.38     |      |      | −14.97 |
| Eleventh surface | aspheric | −21.64   | 0.34     | 1.51 | 57.1 | 90.00  |
| Twelfth surface  | aspheric | 1.38     | 0.47     |      |      | −7.18  |
| Front surface    | Standard | Infinity | 0.21     | 1.52 | 54.5 |        |
| Rear surface     | Standard | Infinity | 0.33     |      |      |        |
| Optical sensor   | Standard | —        |          |      |      |        |

TABLE 5

| Aspheric coefficient | First surface | Second surface | Third surface | Fourth surface | Fifth surface | Sixth surface |
|---|---|---|---|---|---|---|
| A4  | 0.038358  | −0.10617 | 0.038358 | −0.09657 | −0.23438 | −0.56225 |
| A6  | −0.07119  | 0.081457 | 0.276094 | 0.222323 | 0.426495 | 1.136713 |
| A8  | 0.206693  | 0.083502 | 0.045897 | −0.06903 | −1.11767 | −2.30942 |
| A10 | −0.30403  | −0.23193 | −0.37556 | 0.072793 | 1.658505 | 2.878784 |
| A12 | 0.238777  | 0.156835 | 0.340566 | −0.2401  | −1.3012  | −1.91094 |
| A14 | −0.08863  | −0.04089 | −0.08912 | 0.250961 | 0.383941 | 0.479348 |
| A16 |           |          |          |          |          |          |

TABLE 5-continued

| Aspheric coefficient | seventh surface | eighth surface | ninth surface | tentch surface | eleventh surface | twelfth surface |
|---|---|---|---|---|---|---|
| A4  | −0.65393 | −0.33936 | −0.00373 | −0.09057 | −0.33728 | −0.21226 |
| A6  | 0.998148 | 0.28795  | −0.16317 | 0.050939 | 0.072446 | 0.127634 |
| A8  | −1.47763 | −0.14632 | 0.205342 | −0.05899 | 0.084546 | −0.0537  |
| A10 | 1.42539  | −0.04191 | −0.16504 | 0.066646 | −0.05436 | 0.015729 |
| A12 | −0.73153 | 0.081492 | 0.063477 | −0.03423 | 0.01371  | −0.00307 |
| A14 | 0.120877 | −0.02133 | −0.00941 | 0.008    | −0.00165 | 0.000342 |
| A16 |          |          |          | −0.00071 | 7.89E−05 | −1.59E−05 |

TABLE 6

| F (mm) | F/NO | 2ω | D (mm) | TTL (mm) | Z (mm) |
|---|---|---|---|---|---|
| 3.94 | 1.88 | 78.39° | 6.522 | 4.589 | −0.0028 |

| Y (mm) | L (mm) | F1 (mm) | F2 (mm) | F4 (mm) | F5 (mm) | F6 (mm) |
|---|---|---|---|---|---|---|
| 0.398 | 4.92 | 3.39 | −12.65 | 20.85 | 3.53 | −2.51 |

Figure 7:
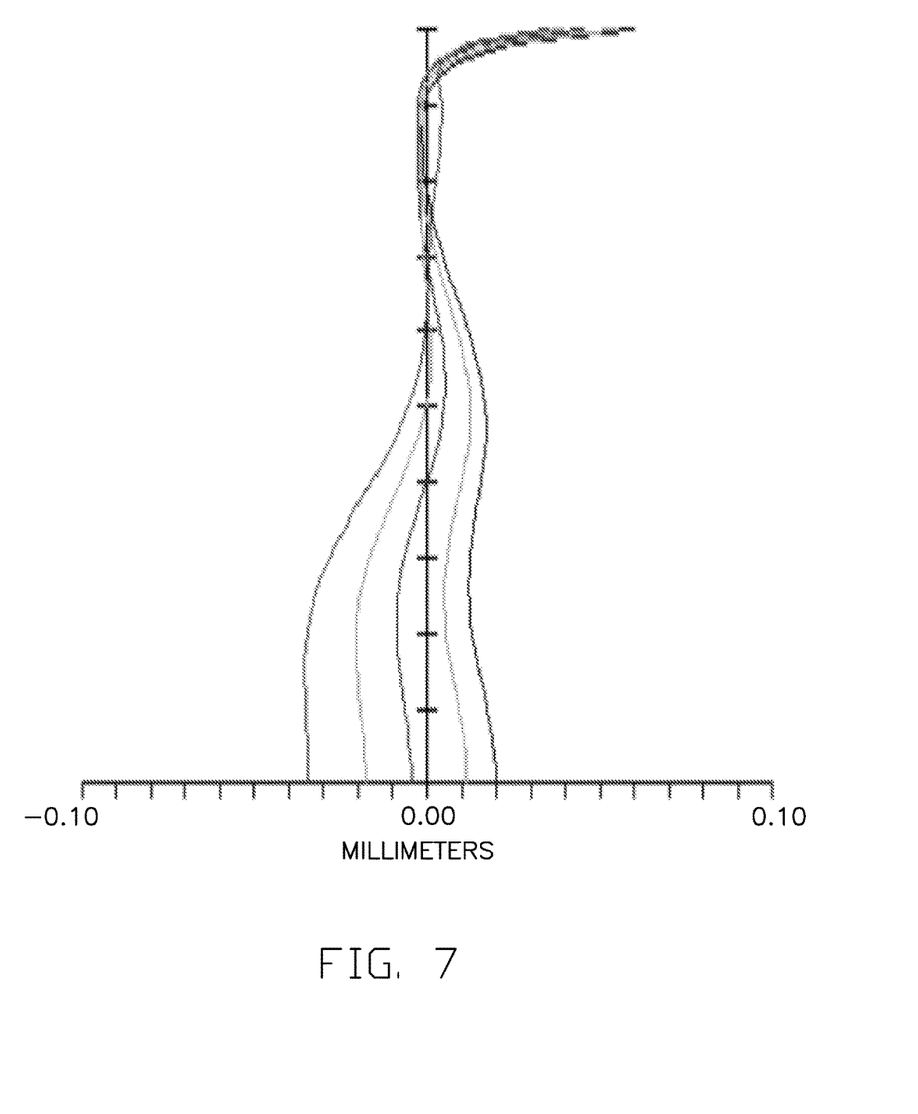
FIG. 7 is a graph showing spherical aberration of the optical lens of a second embodiment.
Figure 8:
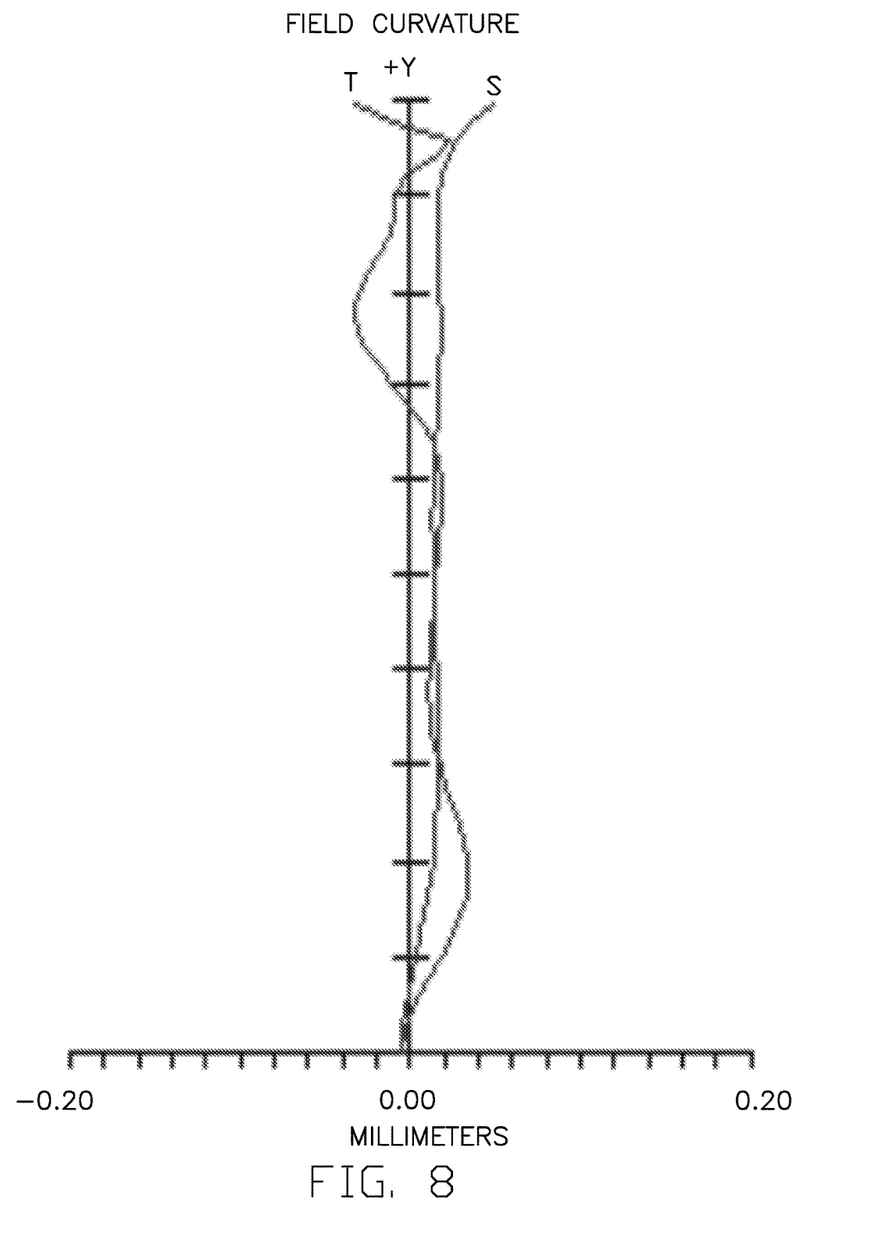
FIG. 8 is a graph showing field curvature of the optical lens of the second embodiment.
Figure 9:
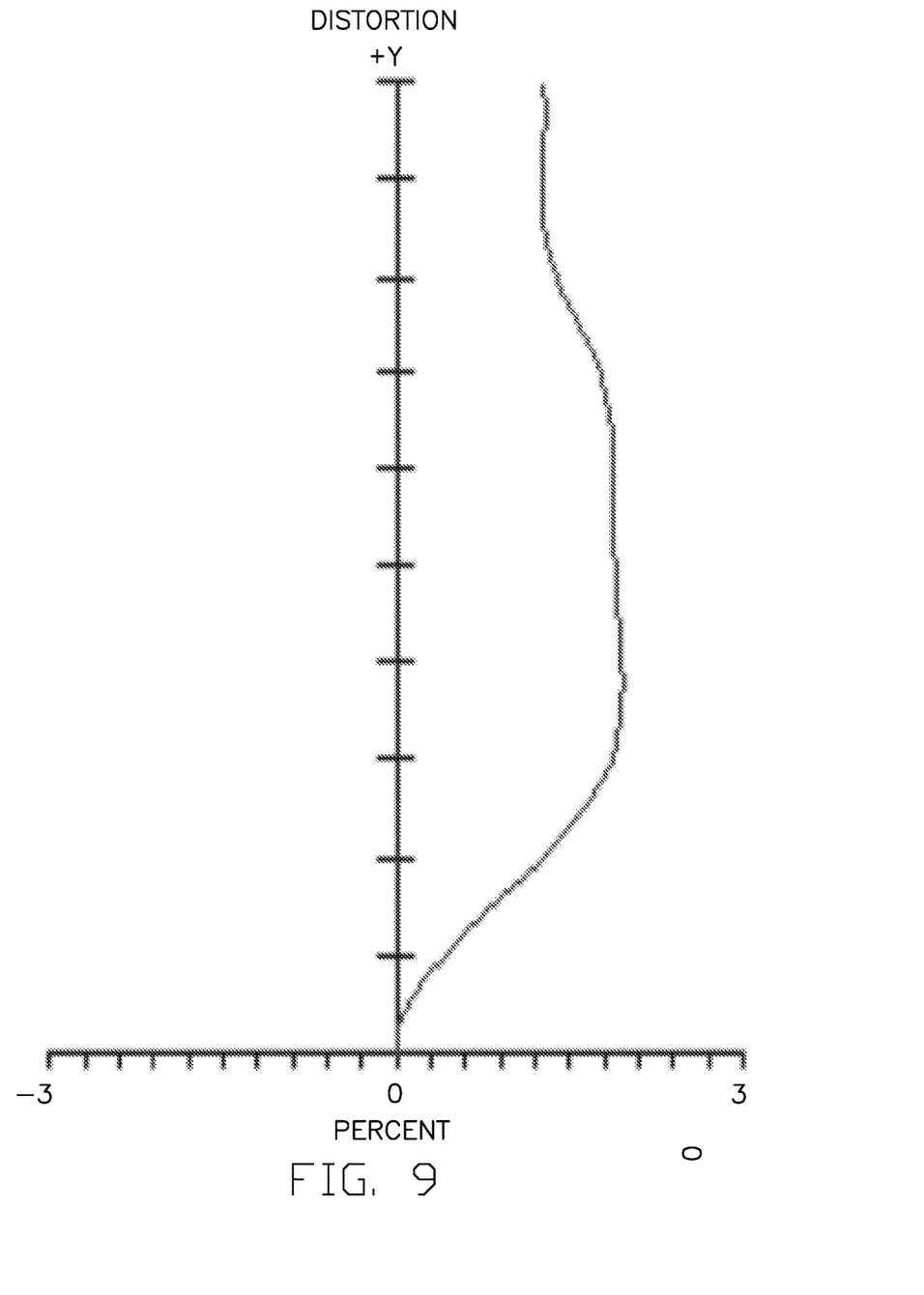
FIG. 9 is a graph showing distortion of the optical lens of the second embodiment.

In the second embodiment, the longitudinal spherical aberration graph, the field curvature graph, and the distortion graph of the optical lens are respectively shown in FIGS. 7-9.

Figure 10:
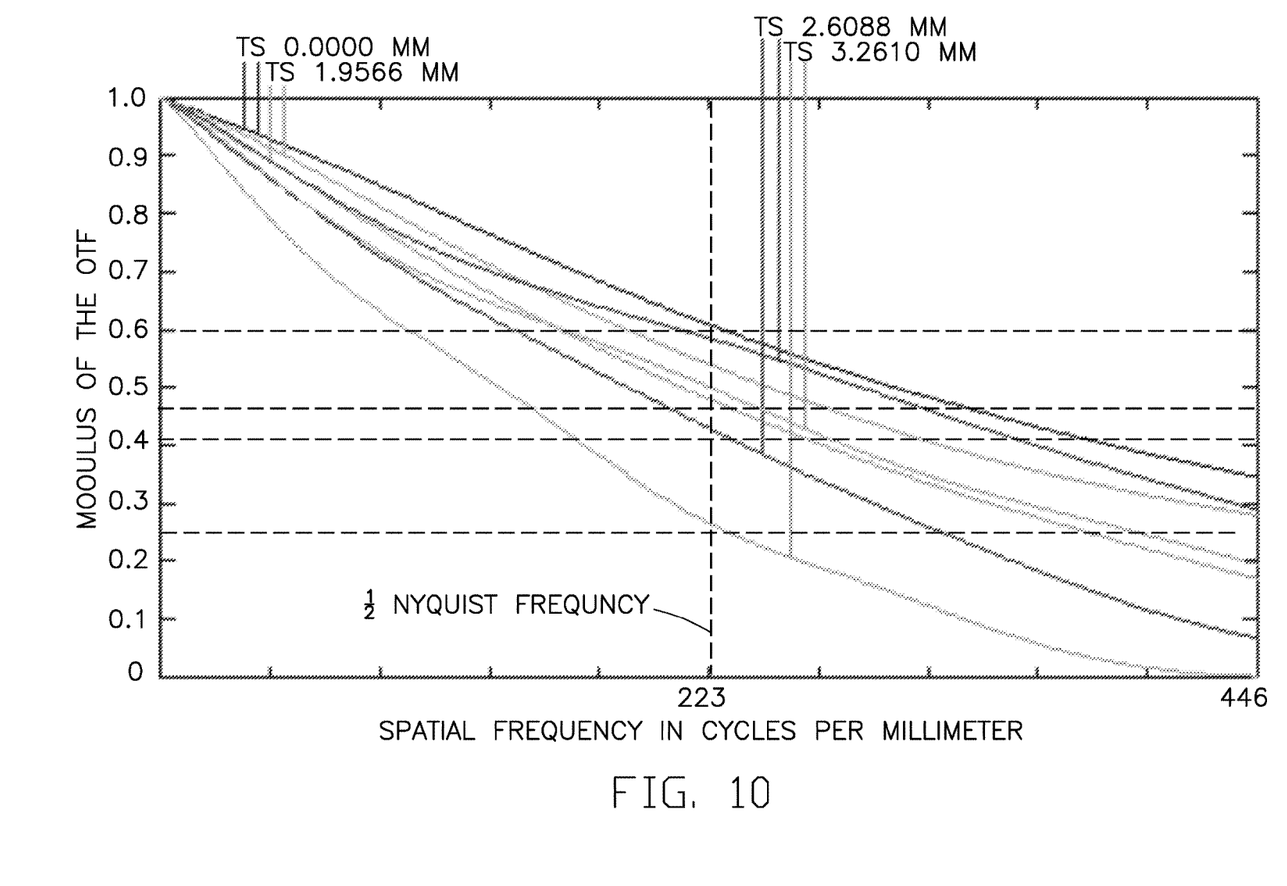
FIG. 10 is a graph showing the field view of modulation Transfer function (MTF) of the first embodiment.

The spherical aberration of visible light (with a wavelength between 400-700 nm) shown in FIG. 7 is within a range of −0.06 mm-0.06 mm. The sagittal field curvature and the tangential field curvature of visible light shown in FIG. 8 are kept in −0.065 mm-0.065 mm. The distortion of visible light in FIG. 9 falls within a range of 0-2%. FIG. 10 illustrates the MTF of the field view at ½ Nyquist frequency. In the exemplary embodiment, the ½ Nyquist frequency is 223lp/mm. The MTF in central field view in FIG. 10 is bigger than 60%, the MTF in 0.8 field view in FIG. 10 is bigger than 40%, the MTF between 0.8 field view and the central field view in FIG. 10 is 40%-60%, the MTF in 1.0 view in FIG. 10 is bigger than 25%. Obviously in the second embodiment, the spherical aberration, field curvature, distortion and the field view of MTF at ½ Nyquist frequency are well controlled in the optical lens.

The embodiments shown and described above are only examples. Many details are often found in the art such as the other features of an optical lens. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, including in matters of shape, size and arrangement of the parts within the principles of the present disclosure up to, and including the full extent established by the broad general meaning of the terms used in the claims. It will therefore be appreciated that the embodiments described above can be modified within the scope of the claims.

What is claimed is:

1. An optical lens having an optical axis, the optical lens comprising in order from an object side of the optical lens to an image side of the optical lens:
   a first lens element having a first surface and second surface opposite to the first surface;
   a second lens element having a third surface and a fourth surface;
   a third lens element having a fifth surface and a sixth surface;
   a fourth lens element having a seventh surface and an eighth surface;
   a fifth lens element having a ninth surface and a tenth surface;
   a sixth lens element having an eleventh surface and a twelfth surface; and
   an optical sensor;
   wherein the optical lens satisfies the following formula:

$D/TTL>1.32, D/L>1.22, 0.017>|Z/Y|>0, 8.35>D/(2*Y)>8.09$;

wherein D is a diameter of the maximum imaging circle, TTL is a length along the optical axis defined between the first surface and the optical sensor, L is an effective diameter of the twelfth surface, Z is a length between the lowest sag position and center position on the ninth surface along the axis direction, Y is a vertically height defined between the maximum sag of the ninth surface and the optical axis.

2. The optical lens of claim 1, wherein the optical lens further comprises an aperture and an optical filter, the aperture is mounted in front of the first lens and respective to the object side, the optical filter is located between the sixth lens element and the optical sensor.

3. The optical lens of claim 2, wherein the optical filter has a front surface and a rear surface, the front surface and the rear surface are flat planes.

4. The optical lens of claim 2, wherein the first lens element, the fourth lens element and the fifth lens element each have positive power, the second lens element, the third lens element and the sixth lens element each have negative power.

5. The optical lens of claim 4, wherein the first surface is convex on the object side, the second surface is concave on the image side, the third surface is convex on the object side, the fourth surface is concave on the image side, the fifth surface is concave on the object side, the sixth surface is convex on the image side, the seventh surface is concave on the object side, the eight surface is convex on the image side, the ninth surface is concave on the object side, the tenth surface is convex on the image side, the eleventh surface is concave on the object side, a center of the twelfth surface is concave on the image side, an edge of the twelfth surface is convex on the image side.

6. The optical lens of claim 2, wherein the optical lens satisfies the formula: $0.67>|G4R1/F4|>|G1R1/F1|>|G2R2/F2|>0.27$, wherein G1R1 is the radius of curvature of the first surface, G2R2 is the radius of curvature of the fourth surface, G4R1 is the radius of curvature of the seventh surface, F1 is the focal length of the first lens element, F2 is the focal length of the second lens element, F4 is the focal length of the fourth lens element.

7. The optical lens of claim 6, wherein the optical lens satisfies the formula: $3.84>|G4R2/F4|>|G1R2/F1|>|G2R1/F2|>0.73$, wherein G4R2 is the radius of the curvature of the eighth surface, G1R2 is the radius of the curvature of the second surface, G2R1 is the radius of curvature of the third surface.

8. The optical lens of claim 7, wherein the optical lens satisfies the formula: G5R1/F5<G6R2/F6, 1|G5R2/F|<|G6R1/F6|, wherein G5R1 is the radius of curvature of the ninth surface, G5R2 is the radius of curvature of the tenth surface, G6R1 is radius of curvature of the eleventh surface, G6R2 is the radius of curvature of the twelfth surface, F5 is the focal length of the fifth lens element, F6 is the focal length of the sixth lens element.

9. The optical lens of claim 8, wherein the optical lens satisfies the formula: G1R1/F1>0.33, G1R2/F1<2.05, G2R1/F2<−0.73, G2R2/F2<−0.27.

10. The optical lens of claim 9, wherein the optical lens satisfies the formula: G4R1/F4<0.67, G4R2/F4>3.55.

11. The optical lens of claim 10, wherein the optical lens satisfies the formula: G5R1/F5<−13.70, G5R2/F5<−0.42.

12. The optical lens of claim 11, wherein the optical lens satisfies the formula: 8.70>G6R1/F6>−16.58, G6R2/F6<−0.43.

13. The optical lens of claim 12, wherein the optical lens satisfies the formula: Vd1>42, Vd3>42, Vd5>42, Vd6>42, Vd2<33, Vd4<33, wherein Vd1 is the Abbe number of the first lens element, Vd2 is the Abbe number of the second lens element, Vd3 is the Abbe number of the third lens element, Vd4 is the Abbe number of the fourth lens element, Vd5 is the Abbe number of the fifth lens element, Vd6 is the Abbe number of the sixth lens element.

* * * * *